United States Patent
Vestberg et al.

(10) Patent No.: US 7,834,094 B2
(45) Date of Patent: Nov. 16, 2010

(54) ALPHA-OLEFIN HOMO-OR COPOLYMER COMPOSITIONS

(75) Inventors: Torvald Vestberg, Porvoo (FI); Peter Denifl, Gries am Brenner (AT); Timo Leinonen, Tolkkinen (FI)

(73) Assignee: Borealis Technology OY, Porvoo (FI)

( * ) Notice: Subject to any disclaimer, the term of this patent is extended or adjusted under 35 U.S.C. 154(b) by 83 days.

(21) Appl. No.: 11/919,594

(22) PCT Filed: Apr. 27, 2006

(86) PCT No.: PCT/EP2006/003935

§ 371 (c)(1),
(2), (4) Date: Jan. 9, 2008

(87) PCT Pub. No.: WO2006/114318

PCT Pub. Date: Nov. 2, 2006

(65) Prior Publication Data

US 2009/0054589 A1 Feb. 26, 2009

(30) Foreign Application Priority Data

Apr. 28, 2005 (EP) .................. 05009343

(51) Int. Cl.
*C08F 210/00* (2006.01)
*C08F 110/06* (2006.01)
*C08F 4/00* (2006.01)
*C08L 23/00* (2006.01)
*C08L 23/04* (2006.01)

(52) U.S. Cl. .................. 525/191; 525/240; 526/351; 526/90; 526/348

(58) Field of Classification Search .............. 525/240, 525/191; 526/351, 348, 90
See application file for complete search history.

(56) References Cited

U.S. PATENT DOCUMENTS

| | | | | |
|---|---|---|---|---|
| 5,403,528 A | * | 4/1995 | Fowler | 264/130 |
| 5,804,304 A | * | 9/1998 | Williams et al. | 428/364 |
| 6,455,643 B1 | * | 9/2002 | Harlin et al. | 526/65 |
| 6,538,081 B2 | * | 3/2003 | Muruganandam et al. | 526/160 |
| 6,803,415 B1 | * | 10/2004 | Mikielski et al. | 525/191 |
| 2004/0176551 A1 | * | 9/2004 | Vestberg et al. | 526/64 |

FOREIGN PATENT DOCUMENTS

| | | |
|---|---|---|
| EP | 0 086 472 | 8/1983 |
| EP | 0 395 083 | 10/1990 |
| EP | 0 491 566 | 6/1992 |
| EP | 0 799 839 | 10/1997 |
| EP | 0 856 390 | 8/1998 |
| EP | 0 887 379 | 12/1998 |
| EP | 1 273 595 | 1/2003 |
| EP | 1 403 292 | 3/2004 |
| JP | 11-323071 | 11/1999 |
| WO | WO- 92/12182 | 7/1992 |
| WO | WO-03/000752 | 1/2003 |
| WO | WO- 03/000754 | 1/2003 |
| WO | WO- 03/000757 | 1/2003 |
| WO | WO- 2004/029112 | 4/2004 |
| WO | WO- 2004/111098 | 12/2004 |

* cited by examiner

*Primary Examiner*—Vasu Jagannathan
*Assistant Examiner*—Irina Krylova
(74) *Attorney, Agent, or Firm*—Jordan and Hamburg LLP

(57) ABSTRACT

The invention is directed an alpha-olefin homo- or copolymer composition comprising at least one (i) alpha-olefin homo- or copolymer component, wherein the alpha-olefin homo- or copolymer composition comprises a decreased amount of $C_6$-$C_{15}$-oligomers.

14 Claims, No Drawings

ALPHA-OLEFIN HOMO- OR COPOLYMER COMPOSITIONS

BACKGROUND OF THE INVENTION

The invention relates to new compositions of alpha-olefin homo- or copolymer as well as to the preparation method thereof. The invention further relates to the use of the alpha-olefin homo- or copolymer composition i.a. in end applications, wherein any taste and/or odor of the polymers are undesired.

BACKGROUND ART

It is well known that a polymer composition obtained from a polymerisation reaction comprises a mixture of polymer molecules with varying chain lengths having different molecular weights (Mw). It is also known that the molecular weight distribution (MWD) of a composition may be tailored to be broad or narrow and the profile may have e.g. one or more maximas.

The MWD curve has typically a low molecular weight (LMW) "tail" comprising very short chain molecules and a high molecular weight (HMW) "tail" comprising very long chain molecules at both end of the curve. The LMW tail of the polymer composition comprises i.a. oligomers. The oligomers are known to be volatile.

The oligomers thus belong to a generally known group of compounds, namely volatiles, which contribute to the undesired taste and/or odour of the final polymer product. The other volatile compounds include e.g. solvents and/or catalyst components which may be used during the polymerisation step, as well as compounds that are optionally incorporated to the polymer composition during or after the polymerisation step, such as some conventional post-reactor additives incorporated to the polymer powder obtained from the polymerisation reactor. Volatiles may also include any degradation products of the polymer or said added compounds.

Such volatiles contribute also to the so called "fogging" problem, i.e. these compounds tend to separate, e.g. evaporate, from the polymer material and cause fogging on the surrounding surfaces e.g. on car windows. Thus in certain end applications the presence of the very LMW tail, particularly of the oligomers, in the polymer composition may not be desirable.

In prior art e.g. WO 03000752 discloses polypropylene composition for expanded granules based on semi-crystalline polypropylene comprising less than 0.025 part by weight of volatile compounds per 100 parts by weight of the polymer. Volatiles are stated to comprise mainly the following components: 1. volatile hydrocarbons, i.e. oligomers of propylene polymer formed during the polymerisation reaction, 2. polymer additive(s) and/or 3. degradation products thereof. As the polymer additives, sterically hindered phenol or organic phosphate are mentioned.

In recent years e.g. polypropylene products have been produced commercially with the so called $4^{th}$ generation high yield Zieglar Natta catalysts. These conventional catalysts comprise typically $TiCl_4$ and internal donors (e.g. ester of carboxylic acids) which are supported on a separately formed $MgCl_2$ based carrier. Such catalyst are widely described in the literature and e.g. in EP395083 of Montell North America, EP86472 of Montedison Spa, EP491566 of Borealis and EP856390 of Chisso Corp. Polymers, produced with these catalysts have typically a high oligomer content.

JP-A-11-323071 discloses a polypropylene composition comprising 3500 ppm oligomers or less. EP 0 799 839 A2 discloses the use of visbreaking to reduce the oligomer content of a polymer composition. EP, 1 273 595 A2 and EP 1 403 292 A2 disclose catalysts for olefin polymerisation. No information regarding oligomer content or MWD of the produced polymers is disclosed.

There is a continuous need for polymer materials which fulfil the increasing environmental and customer requirements in many end application areas of polymer materials, such as packaging, including food and medical packaging (e.g. mono- and multilayered coatings and films or moulded articles), fiber, pipe and automobile industry, without limiting to these.

SUMMARY OF THE INVENTION

The object of the present invention is to provide further alpha-olefin homo- or copolymer compositions for extending the end application window of polymers. Particularly, further alpha-olefin polymers are provided which are highly suitable for end applications, wherein at least one of the properties of taste, odour and fogging are undesired.

THE PRESENT INVENTION

The invention is directed to a new alpha-olefin homo- or copolymer composition which comprises a markedly reduced fraction of alpha-olefin oligomers over the prior art alpha-olefin compositions.

Accordingly, an alpha-olefin homo- or copolymer composition comprising at least one (i) alpha-olefin homo- or copolymer component is provided, whereby (a) the alpha-olefin homo- or copolymer composition comprises C6-C15-oligomers of alpha-olefin in an amount which satisfies the following equitation (1):

$$\text{"oligomer content"} \leq e^{[3.5+(0.504 \cdot ln(MFR_2))]} \quad (1)$$

wherein

"oligomer content" is the amount, in ppm, of alpha-olefin C6-C15-oligomer and

"$MFR_2$" is the $MFR_2$ value of the alpha-olefin homo- or copolymer composition as determined from the alpha-olefin composition, and (b) $MFR_2$ of said composition is at least 0.001 g/10 min.

"Alpha-olefin homo- or copolymer composition" of the invention is referred herein as "polymer composition" and includes herein homopolymers of alpha-olefins and copolymers of alpha-olefins together with one or more comonomers, such as another alpha-olefin(s). Alfa-olefins are understood herein to include ethylene and higher alpha-olefins, e.g. C3-C12-alpha-olefins, such as C3-C10-alpha-olefins. The higher alpha-olefins may be linear, branched, aliphatic cyclic or aromatic cyclic alpha-olefins.

In equitation (1) "e" and "ln" have their generally known meanings, i.e. "e"≈2,718 and "ln" means the natural logarithm.

The invention includes any polymer composition, wherein the value of alpha-olefin C6-C15-oligomer measured from said composition equals or is less than "oligomer content"-value obtained from equitation (1) when using the $MFR_2$ value measured from said polymer composition.

As to the definitions and measurements of C6-C15-oligomer content and $MFR_2$: The alpha-olefin C6-C15-oligomer means the alpha-olefin oligomer fraction with oligomers containing 6 to 15 carbon atoms. The C6-C15-oligomer content is preferably measured using the determination method described later below under "Definitions and Determination methods". The parameter ppm refers to parts per million by weight. The $MFR_2$ refers to the melt flow rate of the polymer composition determined in a manner known in the art. Accordingly, the $MFR_2$ value of propylene (PP) composition is preferably determined according to ISO 1133 at 230° C., using 2.16 kg load and $MFR_2$ of ethylene (PE) composition using e.g. 1133 (190° C., 2.16 kg load).

Oligomers as described herein are thus products originating from the polymerisation of monomers of the alpha-olefin homo- or copolymer of the invention.

Typically, said oligomers originate from the low Mw tail of the polymer composition produced during the polymerisation process.

The present low amount of C6-C15-oligomers is beneficial e.g. for many demanding end applications of polymers. Moreover, the low level of C6-C15-oligomers indicates also markedly reduced levels of the total oligomers, e.g. of up to C39 or higher oligomers, present in the polymer composition.

The decreased C6-C15-oligomer fraction as defined above and determinable e.g. as defined herein below can reduce or prevent the above mentioned taste, odour problems and fogging of volatiles at levels that are very feasible in many end applications. Thus any further treatments of polymer composition for removing the volatiles can be completely avoided or in such treatment steps, if needed, markedly milder conditions and/or shorter treatment times over the prior art treatments can be used. The risk of deteriorating and/or changing the originally produced composition due to such removal treatments can therefore be minimised.

According to one preferable embodiment, the polymer composition of the invention is so called reactor-made polymer composition. It is very advantageous that a reactor-made polymer composition can satisfy the equitation (1) as is the case in this embodiment.

"Reactor-made polymer composition" means herein the reaction product which is obtained from a polymerisation reaction of the alpha-olefin monomers, optionally together with one or more comonomers. Accordingly, "reactor-made polymer composition" refers to the polymerisation product as obtained from a polymerisation step, i.e. it has not been subjected to any post reactor treatments, e.g. chemical treatments, such as visbreaking with organic peroxides, which are conventionally used to modify further the MFR of the polymer product, or treatments which would modify the oligomer content or MFR of the composition. Reactor-made polymer composition is sometimes referred also as reactor powder. Naturally, the reactor-made composition of the invention can further be subjected to such treatments, if desired.

The oligomer content as referred to in the present application, in particular for the reactor-made products, is the oligomer content as obtained after polymerisation and before employing usual process steps for reducing the oligomer content, such as degassing, although the present invention does not exclude the use of such treatments, including degassing, for further reducing the oligomer content.

The reactor-made polymer compositions as envisaged by the present invention comprise polymer compositions being the product of a singe stage polymerisation process as well as multi stage polymerisation processes, including polymerisation sequences comprising different types of polymerisation reactors and/or conditions, as explained in further detail below under the heading "Polymerisation process". The embodiments described there in connection with the polymerisation process apply also to the reactor-made polymer compositions as disclosed herein.

In this preferable embodiment, both determinations of said polymer composition, i.e. the determination of the $MFR_2$ value of the polymer composition used in the equitation (1) to calculate the upper limit of the C6-C15-oligomer content and the determination of the actual oligomer content of the composition, are analysed from the reactor-made polymer composition (reactor powder) as such before any optional subsequent post-reactor treatment thereof.

The below given embodiment describing propylene polymer compositions preferably defines a propylene homopolymer composition, but the embodiment disclosed likewise also is applicable for other propylene polymers, including in particular propylene copolymers with ethylene.

In a preferable embodiment, the polymer composition is a propylene homo- or copolymer which is referred herein as PP composition. Accordingly, the propylene homo- or copolymer composition comprises at least one (i) propylene homo- or copolymer component, whereby (a) the propylene homo- or copolymer composition comprises C6-C15-oligomers of propylene in an amount which satisfies the following equitation (1'):

$$\text{"oligomer content"} \leq e^{[3.5+(0.504 \cdot ln(MFR_2))]} \quad (1')$$

wherein

"oligomer content" is the amount, in ppm, of propylene C6-C15-oligomer and

"$MFR_2$" is the $MFR_2$ value of the propylene homo- or copolymer composition as determined from the PP composition, and (b) $MFR_2$ of said composition is at least 0.001 g/10 min.

Recently, the trend has been towards polymer materials with higher melt flow rate (MFR). Higher MFR means better processability of the polymer material i.a. due to good flowability. Thus faster through put of the process lines for producing end application articles from the polymer, and thus cost savings, can be achieved. It is well known in the art that the higher the MFR the higher the content of the LMW component of the polymer. Accordingly, also the oligomer content in polymer composition increases with increasing MFR. Therefore polymers with high MFR, but still low oligomer content are becoming increasingly important. Embodiments of the polymer composition of the invention, wherein the $MFR_2$ of the composition is high, are thus very feasible material for such end applications.

The oligomer content of the composition of the invention is decreased both in case of a polymer compositions with high melt flow rate and with low melt flow rate over the prior art compositions with corresponding $MFR_2$.

In the following some preferable subranges of the oligomer content of the composition are given. It is evident that all the below embodiments (subranges) may equally be satisfactory and depend i.a. on the demands of the end application.

Thus in one embodiment (a) the polymer composition corresponds to the following equitation (1a):

$$\text{"oligomer content"} \leq e^{[3.3+(0.504 \cdot ln(MFR_2))]} \quad (1a),$$

wherein "oligomer content" and $MFR_2$ are as defined above.

In another embodiment (b) the polymer composition corresponds to the following equitation (1b):

$$\text{"oligomer content"} \leq e^{[2.8+(0.504 \cdot ln(MFR_2))]} \quad (1b),$$

wherein "oligomer content" and $MFR_2$ are as defined above.

In some embodiments even lower oligomer contents are desired for a polymer composition with a certain $MFR_2$. In these embodiments (c) the oligomer content may even correspond the equitation (1c)

$$\text{"oligomer content"} \leq e^{[2.7+(0.504 \cdot ln(MFR_2))]} \quad (1c),$$

wherein "oligomer content" and MFR$_2$ are as defined above.

Also the MFR$_2$ value of the polymer composition may vary depending on the desired end use application of the composition. Again it is evident that all the below embodiments (subranges) may equally be satisfactory and the choice depends i.a. on the end application which determines the MFR range usable in that application. The polymer composition may be selected from any of the below embodiments alone or in any combinations thereof:

embodiment (i) MFR$_2$ of not more than 1000 g/10 min, or
embodiment (ii) MFR$_2$ of not more than 100 g/10 min, or
embodiment (iii) MFR$_2$ of not more than 10 g/10 min,
embodiment (iv) MFR$_2$ of 1 g/10 min or lower.

The MFR$_2$ of the polymer composition is preferably at least 0.01 g/10 min, more preferably at least 0.1 g/10 min.

In further embodiment (v) the polymer composition with a MFR$_2$ of between 50 and 500 g/10 min can be advantageous for the desired end application of the composition.

The polymer composition of the invention is preferably a homo- or copolymer of ethylene or propylene.

The invention is further directed to an alpha-olefin composition which is selected from one or more of (P1) to (P7):

(P1) composition having a MFR$_2$ of not more than 1000 g/10 min and an oligomer content of less than 100 ppm, preferably less than 900 ppm, (P2) composition having a MFR$_2$ of not more than 500 g/10 min and an oligomer content of less than 760 ppm, preferably less than 630 ppm, (P3) composition having a MFR$_2$ of not more than 100 g/10 min and an oligomer content of less than 340 ppm, preferably less than 280 ppm, (P4) composition having a MFR$_2$ of not more than 50 g/10 min and an oligomer content of less than 240 ppm, preferably less than 200 ppm, (P5) composition having a MFR$_2$ of not more than 10 g/10 min and an oligomer content of less than 110 ppm, preferably less than 90 ppm, (P6) composition having a MFR$_2$ of not more than 1 g/10 min and an oligomer content of less than 35 ppm, preferably less than 30 ppm, and (P7) composition having a MFR$_2$ of not more than 0.1 g/10 min and an oligomer content of less than 10 ppm, preferably less than 8 ppm.

For the reasons already given above each of the combination are equally preferable. Moreover, any of these limits can be used to form further embodiments of subranges with lower and upper limits. These further embodiments include without limiting e.g. a polymer composition having MFR$_2$ and oligomer content which is between the limits given for (P2) and (P4), i.e. MFR$_2$ between the range of 50 g/10 min to 500 g/10 min and the C6-C15-oligomer content between the range of 240 ppm to 760 ppm.

The compositions (P1) to (P7) covered by the present invention are thus independent from the composition satisfying the equitation (1) and any subgroups given above. However, as one preferable embodiment of the composition of (P1) to (P7), the composition of (P1) to (P7) also fulfil the equitation (1) and optionally may be combined with any of the above subgroup embodiments defined for the composition of equitation (1). Furthermore, the composition of (P1) to (P2) is suitably a PE or PP composition, preferably a PP composition.

As still further embodiments the present invention provides polymeric products being characterized in that they satisfy the low oligomer content requirement as defined in the present application, in particular of any one of equations (1), (1a), (1b) and (1c), while at the same time providing a MFR$_2$ value of 15 or higher, preferably 20 or higher, more preferably 25 or higher and in embodiments even 45 or higher (always g/10 min and determined in accordance with the description and definition provided herein). A suitable upper limit for the MFR$_2$ value for this embodiment of the present invention is about 1000, and preferably about 500, and in embodiments 250 or even 150 (always g/10 min).

Preferred examples of the above MFR$_2$ embodiment of the present invention are polymeric products as defined and described herein wherein the oligomer content is below 1100 ppm, preferably below 760 ppm, and in embodiments below 560 ppm, below 340 ppm, below 240 ppm, below 110 ppm, below 35 ppm and even below 10 ppm.

Further preferred ranges for combinations of MFR$_2$ values and oligomer content can be derived from the following table:

| MFR$_2$ | Oligomer content ppmw as indicated or lower | | | | | |
|---|---|---|---|---|---|---|
| <0.1 | 10 | 8 | 5 | 5 | 7 | 4 |
| <1 | 35 | 30 | 16 | 15 | 21 | 13 |
| <15 | 130 | 106 | 64 | 58 | 82 | 53 |
| <20 | 150 | 123 | 74 | 67 | 95 | 61 |
| <25 | 168 | 137 | 83 | 75 | 106 | 68 |
| <45 | 226 | 185 | 112 | 101 | 143 | 92 |
| <100 | 340 | 280 | 168 | 152 | 214 | 137 |
| <150 | 414 | 339 | 205 | 186 | 262 | 168 |
| <250 | 535 | 438 | 266 | 241 | 339 | 218 |
| <500 | 760 | 630 | 377 | 341 | 481 | 308 |
| <1000 | 1100 | 900 | 535 | 484 | 682 | 437 |

In the table the first column defines a polymer composition in accordance with the present invention wherein the composition furthermore preferably satisfies the requirement of equation (1) as provided in this application. The second column likewise defines a composition furthermore satisfying equation (1a), the third column furthermore preferably satisfies equation (1b), the fourth column furthermore preferably satisfies equation (1c), the fifth column furthermore preferably satisfies equation (1d), and the sixth column furthermore preferably satisfies equation (1e) (formulae (1d) and (1e) are defined further below).

In the above embodiments and subgroups of the present invention MFR$_2$ and oligomer content are preferably the properties, as already outlined above, of the reactor-made polymer composition, i.e. the properties obtained after polymerisation without any post processing, with the only exception being standard extrusion processes for producing pellets and the like. These pellets accordingly then display the same properties as the reactor-made polymer composition.

It is evident that, within the embodiments of the present invention described above and in particular within the limits defined by equitation (1), (1') (1a) to (1e), or (P1) to (P7), the other properties of the polymer composition can also be varied or tailored considerably depending i.a. on the end use application. The other properties of the polymer composition include the properties of the polymer structure, such as molecular weight distribution (MWD and/or PI), xylene solubles (XS), chain (stereo)structure and comonomer content, stereo regularity and comonomer distribution, the processing properties including herein the physical properties (such as rheological and thermal properties) and morphological properties (such as crystal and lamella structure as well as crystallinity), as well as the properties the final product produced from the polymer composition (e.g. stiffness, impact, creep etc.). As an example only, a propylene homopolymer may have xylene solubles (XS) varying between 1 and 5 wt-% and the XS value of a propylene random copolymer may vary between 1 to 50 wt-%, preferably 1-30 wt-%, such as 1 to 15 wt-%.

In a further preferred embodiment the polymer composition in accordance with the present invention not only displays the feasible balance of oligomer content and $MFR_2$ values but also shows a remarkable narrow molecular weight distribution. The narrow molecular weight distribution can be expressed in various alternative ways, e.g. in terms of rheological behaviour expressed as $SHI_{(0/50)}$.

Accordingly the polymer compositions of the present invention have a narrow molecular weight distribution, typically a $SHI_{(0/50)}$ value of 10 or less, more preferably 8 or less and even more preferably 6 or less.

In this "narrow molecular weight distribution embodiment" the polymer composition may preferably have a MWD value of 6 or less, more preferably 5 or less, and even more preferably of from 3 to 5 or from 3.5 to 5. Furthermore in this embodiment the polymer compositions of the present invention described here further preferably display a PI value of 5 or less, more preferably 4 or less.

Alternatively, the combination of advantageous oligomer content and narrow molecular weight distribution of the polymer composition, preferably of the propylene polymer composition, can also be expressed with the following equation (1n):

$$\text{Oligomer content} \leq e^{(3.83+0.398 \cdot \ln(MFR2)+0.0669 \cdot MWD)} \quad (1n)$$

More preferably the polymer compositions are compositions corresponding to the following equation (1n'):

$$\text{Oligomer content} \leq e^{3.25+0.3981 \cdot \ln(MFR2)+0.0669 \cdot MWD} \quad (1n')$$

In these equations "$MFR_2$" and "MWD" are determined as defined herein below and $MFR_2$ is 0.5 g/10 min or more and MWD is 3 or more while the "Oligomer content", in ppm, refers to the oligomer content as defined herein.

The polymer composition corresponding to formula (1n) or (1n') have a $SHI_{(0/50)}$ value of 10 or less, more preferably 8 or less and even more preferably 6 or less.

In this "narrow molecular weight distribution embodiment" the polymer composition may preferably have a MWD value of 6 or less, more preferably 5 or less, and even more preferably of from 3 to 5 or from 3.5 to 5. Furthermore in this embodiment the polymer compositions of the present invention described here further preferably display a PI value of 5 or less, more preferably 4 or less.

These further improved and surprising embodiments of the present invention in particular enable the use of polymer compositions in accordance with the present invention in fields where narrow molecular weight distributions are required, such as fiber applications since mechanical properties can be improved.

Furthermore in one embodiment the polymer composition comprises at least (i) a homopolymer component, preferably propylene (PP) homopolymer. In the case of "the narrow molecular weight distribution embodiments" described above the polymer composition preferably is a propylene homopolymer.

In another embodiment the polymer composition comprises at least (i) a copolymer component, preferably PP copolymer, more preferably PP random copolymer.

In a further embodiment the polymer composition comprises at least (i) a homopolymer or copolymer and at least (ii) a homopolymer or copolymer, in any combination. It is understood that such components (i) and (ii) are different. As well known the weight ratios thereof (split) may vary. The amount of component (i) may be 30 to 80, e.g. 40 to 70, preferably 45 to 60, wt-% and the amount of component (ii) may be 20 to 70, e.g. 30 to 60, preferably 40 to 55, wt-%, calculated from the total composition, particularly in case of PP compositions.

Alternatively, the polymer composition may consist of any of the above embodiments of components (i) or of (i) and (ii).

The alpha-olefin copolymer can be unimodal or multimodal with respect to comonomer distribution as known in the art.

The copolymer, e.g. in case of PP copolymer is preferably a PP random copolymer and may comprise in a well known manner a mixture of a homopolymer and copolymer components or a mixture of two copolymer components with differing comonomer contents.

Comonomers can be selected e.g. from a list including one or more of ethylene and C3- or higher alpha-olefins, such as C4-C12-, e.g C4-C10-alpha-olefins. In case of PP composition the comonomer is preferably at least ethylene. The C3- or higher alpha-olefin comonomer(s) can be linear, branched, aliphatic cyclic or aromatic cyclic alpha-olefins. They may be used e.g. in usual amounts, e.g. from up to 20 wt %.

In case of unimodal polymer compositions with respect to the weight average molecular weight distribution the composition may comprise one component (i) or at least two components (i) and (ii). In case of at least two components (i) and (ii) both have essentially the same weight average molecular weight distribution so that the overall molecular weight profile of the polymer composition has a single peak. In the above described "narrow molecular weight distribution embodiments" the polymer composition is preferably unimodal, more preferably a unimodal homopolymer of propylene, and comprises components (i) and (ii).

Furthermore, the polymer composition may be unimodal or multimodal with respect to the molecular weight distribution. In case of multimodal polymer composition the composition comprises at least a lower molecular weight (LMW) component and a higher molecular weight (HMW) component.

As is readily apparent from the above description, the term polymer composition or homo- or copolymer composition as employed herein refers to a polymeric product comprising at least one but in embodiments also more then one polymeric product. In accordance with the present invention it is required that at least one of the polymeric products fulfils the requirements as outlined and explained herein, but preferably the overall polymer composition fulfils these requirements, i.e. the composition comprising more then one polymeric product. Such compositions may be prepared in any suitable manner, including mechanical or melt blending as well as suitable polymerisation processes for the preparation of reactor-blends. Such reactor blends as defined herein are preferred embodiments of the present invention. In this respect reference is made to the detailed description under the heading "Polymerisation process".

It is naturally understood that the properties of the polymer composition of the invention can be further modified. E.g. the preferable reactor-made polymer composition of the invention may be further modified, e.g. after the polymerisation step, in one or more subsequent post reactor treatment steps. It is evident that such modifications may result in another polymer composition of the invention or to other polymer products.

Such modifications include the well known post reactor chemical modification of the MFR of the polymer (visbreaking) using e.g. peroxides e.g. for increasing the MFR.

The polymer composition may also comprise e.g. additives or other polymer components which may result in a polymer composition with modified properties, as known in the art.

As mentioned the C6-C15-oligomer content of the polymer composition may contribute to the total amount of volatiles producing compounds. Additionally, it may also comprise other compounds or decomposition products which are often referred under volatiles producing compounds, e.g. volatiles originating from the overall oligomers or from any-added additives, as described above or in the prior art, e.g. in WO 03000752. The amount of these "other compounds" is not limited in this invention, and they may increase or contribute to the total amount of volatiles present in the polymer composition. If needed, this total volatile content may further be reduced or removed in a subsequent removal step in a known manner, depending e.g. on the desired end application.

The present invention achieves the improvement with respect to the oligomer content as identified and discussed above without requiring costly and/or laborious post polymerization processes, as often needed and relied upon in the prior art. Accordingly the present invention is able to provide the polymer products disclosed herein in the form of pellets or any other desired shape such as rods, powder, spheres and the like, immediately after the polymerization process, requiring only standard measures such as extruding under standard conditions, but no other post treatments, such as visbreaking and the like.

Such pellets and the like are in particular suitable for applications in fields having increased demands on organoleptic properties, the present invention provides pellets of polymer compositions directly obtained from polymerization and subsequent pelletisation without any further post processing. The improved properties of the polymer compositions of the present invention, i.e. in particular the low oligomer content, and in embodiments specific $MFR_2$ values as explained herein and relatively narrow molecular weight distribution values, are accordingly directly passed on to the pellets and are present therein, so that these pellets may suitably be used in high quality end applications, such as applications requiring a low volatile and low oligomer content, for example in order to suppress or exclude detrimental effects such as fogging and/or migration.

These advantages are furthermore not sacrificed by subjecting the polymer composition in accordance with the present invention to a subsequent pelletizing process, such as a process using an extruder or any other conventional device for palletizing. The pelletizing process involves melting and mixing steps of the reactor made polymer powder, optionally together with conventional additives, in an extruder and thereafter forming the extrudate in the form of pellets as known in the art.

The polymer composition can be used alone or in the form of a blend with other polymer components.

The invention covers also heterophasic polymers of an alpha-olefin (also called block copolymers), preferably of propylene, whereby the PP composition of the invention forms the polypropylene matrix component, wherein an elastomeric propylene copolymer component, so called rubber component, is dispersed. Comonomers can be selected from the options given above.

The polymer composition as defined in the present invention can be used in a wide variety of end applications, e.g. applications wherein the odor, taste and/or fogging should be avoided or minimized, e.g. in automobile, packaging (including food and medical), fiber, pipe or wire and cable (W&C) industry without limiting to these.

The invention provides also a further step of pelletising the polymer composition to polymer pellets. The pellets can be formed in a subsequent pelletising step e.g. by extrusion as known in the art and may comprise additives in the known manner as indicated above. In addition to the polymer of the invention, the pellets may also comprise further polymer components.

Moreover, the PP composition, optionally in the form of pellets, can be processed in a known manner to articles, including molded and extruded articles, layered structures, fibers, pipes, just few to mention.

The layered structures of the PP composition can be mono-layer or multilayer structures including films, coatings, packaging materials, cables etc.

Polymerisation Process for the Preparation of the Polymer Composition of the Invention In principal any polymerisation method including slurry and gas phase polymerisation can be used for producing the polymer composition. Slurry polymerisation is preferably a bulk polymerisation. "Bulk" means a polymerisation in a reaction medium comprising at least 60 wt-% monomer.

The invention also provides a process for producing a polymer composition comprising at least (i) an alpha-olefin homo- or copolymer component as defined above or in claims below, wherein alpha-olefin monomers, optionally together with one or more comonomers, are polymerised in the presence of a polymerisation catalyst. In case the polymer composition consists of component (i) the process is a single stage process.

The invention further provides a process for producing a polymer composition comprising at least two different alpha-olefin homo- or copolymer components (i) and (ii) as defined above or in claims below, wherein each component is produced by polymerising alpha-olefin monomers, optionally together with one or more comonomers, in the presence of a polymerisation catalyst in a multistage polymerisation process using one or more polymerisation reactors, which may be the same or different, e.g. at least loop-loop, gas-gas or any combination of loop and gas. Each stage may be effected in parallel or sequentially using same or different polymerisation method. In case of a sequential stages each components, e.g. (i). and (ii), may be produced in any order by carrying out the polymerisation in each step, except the first step, in the presence of the polymer component formed, and preferably the catalyst used, in the preceding step. Alternatively, the same or different catalyst can be added in the subsequent step(s).

Preferably, at least the component (i) is produced in a slurry process, preferably bulk process. Such slurry or bulk process may be carried e.g. in a slurry reactor or, preferably, a loop reactor. The optional component (ii) is preferably produced by gas phase polymerization in a gas phase reactor.

Multistage processes include also bulk/gas phase reactors known as multizone gas phase reactors for producing e.g. multimodal polymer compositions.

A multimodal, e.g. at least bimodal, polymer composition as defined above, which comprises at least two different components (i) and (ii) with different molecular weight distribution and/or with different comonomer contents, may be produced by blending each or part of the components in-situ during the polymerisation process thereof (in-situ process) or, alternatively, by blending mechanically two or more separately produced components in a manner known in the art.

It is also possible to produce a multimodal PP composition in one reactor by selecting e.g. one or more of the following:

(1) changing polymerisation conditions, (2) using at least two different catalysts and (3) using at least two different comonomer feeds.

In one embodiment the process for producing any of the above polymer composition (referred below also as "process for producing the polymer composition") comprising (i) an alpha-olefin homopolymer or copolymer component and, optionally, (ii) an alpha-olefin homopolymer or copolymer component includes the steps of:

(a) polymerising in a slurry reactor zone, preferably a loop reactor, alpha-olefin monomers, optionally together with one of more comonomers, in the presence of a polymerisation catalyst to produce polymer component (i), and, optionally, transferring the reaction product of step (a) to a subsequent gas phase reactor zone, (b) polymerising in a gas phase reactor zone alpha-olefin monomers, optionally together with one or more comonomers, in the presence of the reaction product of step (a) to produce polymer component (ii) for obtaining the polymer composition, and recovering the obtained composition.

A preferred multistage process is a "loop-gas phase"-process, such as developed by Borealis A/S, Denmark (known as BORSTAR® technology) described e.g. in patent literature, such as in EP 0887 379 or in WO92/12182.

If the polymer composition has at least a multimodal molecular weight distribution, then in case of PP, the HMW fraction is preferably component (i) produced in step (a) and the LMW fraction is component (ii) which is produced in a subsequent step (b) in the presence of component (i) as obtained from the first reactor.

In the case of a unimodal polymer compositions with respect to the weight average molecular weight distribution a composition comprising at least two-components (i) and (ii) both having essentially the same weight average molecular weight distribution so that the overall molecular weight profile of the polymer composition has a single peak, the composition preferably is prepared using a two stage process as described above ("process for producing the polymer composition"), preferably using the above described BORSTAR® technology.

Optionally, a prepolymerisation step in a manner known in the field may precede the polymerisation step (a).

If desired, a further elastomeric comonomer component, so-called rubber component, may be incorporated into the obtained polymer, preferably PP, composition to form a heterophasic copolymer of the composition mentioned above. The rubber component, preferably elastomeric PP copolymer of PP with at least ethylene comonomer, may preferably be produced after the gas phase polymerization step (b) in a subsequent second or further gas phase polymerization zones using e.g. one or more gas phase reactors.

The process of the invention is preferably a continuous process.

Preferably, the "process for producing the polymer composition" as defined above is a PP polymerization process, wherein conditions for the slurry reactor of step (a) may be as follows:

the temperature is within the range of 40° C. to 110° C., preferably between 60° C. and 100° C., 70-90° C., the pressure is within the range of 20 bar to 80 bar, preferably between 30 bar to 60 bar, hydrogen can be added for controlling the molar mass in a manner known per se;

the reaction mixture from the slurry (bulk) reactor is transferred to the gas phase reactor, i.e. to step (b) and conditions in step (b) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The process of the invention or any embodiments thereof above or below enable highly feasible means for producing and further tailoring the polymer composition of the invention as defined in any of the above described embodiments, preferably as defined by equation (1), (1a) to (1e), or by (P1) to (P7) to adjust e.g. the properties of the polymer desired for the end application. E.g. the properties of the polymer composition can be adjusted or controlled in a known manner e.g. with one or more of the following process parameters: hydrogen feed, comonomer feed, alpha-olefin feed in the gas phase reactor, preferably propylene and comonomer feeds, catalyst, the type and amount of an external donor (if used), split between components, e.g. components (i) and (ii).

The MFR values used in the above equitation (1), (1') and (1a) to (1c), or later below in (1d) or (1e), as well as (P1) to (P7) are preferably determined from the reactor-made polymer composition. As well known, the adjustment of said MFR value to a desired level may be effected during the polymerisation process by adjusting and controlling the process conditions, e.g. by regulating the molecular weight of the polymerisation product using a molecular weight regulator, e.g. hydrogen.

In one preferable embodiment a PP composition produced and the polymerisation is effected at elevated temperature, such as at least 70° C., more preferably at least 80° C. for further decreasing the oligomer content.

Furthermore, the crystallinity of the PP composition can be modified further during or after the polymerisation step with nucleating agents in a manner known in the art.

As mentioned above the reactor-made polymer product may also subjected to a post-reactor modifications for further tailoring the properties of the obtained polymer product, which include e.g. a chemical post-treatment, i.e. visbreaking, with organic peroxides to adjust further the MFR of the reactor-made polymer product. Also additives or further polymers may be added to modify the product and/or processing properties of the polymer. The additives include the conventional fillers, colorants and stabilizers.

The obtained polymer composition may also be e.g. extruded in a known manner to obtain pellets. The composition, optionally in the form of pellets, may then be further processed to the desired articles used in the end applications.

Thus the polymer composition of the invention is preferably the reactor-made composition which can be tailored or modified within the limits of the invention during or after the polymerisation step.

Alternatively, as already indicated above, it is also to be understood that the composition of the invention with advantageously low oligomer content may be used as a starting material for producing further polymer compositions which may not satisfy the equitation (1) or one of the definitions (P1) to (P7).

The principles of the preferable polymerisation methods described above can be applied for any alpha-olefin composition of the invention, preferably e.g. for PP or PE composition.

Catalyst System

In principle the polymer composition of the invention can be produced using any polymerisation catalyst which provides an alpha-olefin polymer that fulfils the balance between oligomers and MFR, e.g. as given by the equitation (1) or one of the definitions (P1) to (P7). Such catalyst may include known Ziegler Natta type of catalysts, metallocenes including the single site catalysts and non-metallocenes. The meaning of this type of catalysts is known in the field. The catalyst may be based on one or more transition metal catalysts or late transition metal catalysts or any combinations thereof.

Examples of the feasible catalyst are illustrated by preferable preparation embodiments of a PP composition. It is, however, evident that the invention is not limited to these embodiments of PP, but principles described below e.g. for the catalyst preparation apply generally also to embodiments of other alpha-olefin compositions, such as to PE compositions.

Preferably, the polymerisation catalyst system for polymerisation of the PP composition is of a Ziegler Natta type and comprises:
1. a catalytically active component, e.g. as described above, preferably a Ti- and Mg-containing component which comprises an internal electron donor which can be any known in the art, e.g. as described below for the one preferable embodiment of the catalyst system,
2. a cocatalyst which is preferably an Al-compound, such as trethyl alumininum (TEA), and
3. an external electron donor. Examples of such donor are e.g. organosilicon compounds, such as silanes, e.g. cyclohexyl methyl dimethoxy silane or dicyclopentyl dimethoxy silane, depending on the properties desired for the final PP composition.

The molar ratio Al/external donor in the catalyst system may vary and is typically 3 to 200, such as 5 to 100, mol/mol. The Al typically originates from the cocatalyst. Also the molar ratio of Al/Ti in the catalyst system may vary and is typically between 50 to 500. E.g. 100 to 300 mol/mol ratio may be used.

Noticing the requirements of the other end properties desired for the PP composition, also e.g. the choice of the donor and the amount thereof may be used for further tailoring the oligomer content within the limits of the invention defined with the MFR.

In general one very advantageous way for obtaining the polymer composition is to use a polymerisation catalyst produced with the emulsion solidification technology disclosed below. Said catalyst is preferably of a Ziegler Natta type and comprises a compound of a transition metal of Group 3 to 10 of the Periodic Table (IUPAC, 1989), or of an actinide or lanthanide, and may be prepared according to the following "catalyst preparation method" comprising:
(a) forming a liquid/liquid emulsion system, which contains a homogeneous solution of at least one catalyst component, said solution being dispersed in a solvent immiscible therewith and forming the dispersed phase of the liquid/liquid emulsion system,
(b) solidifying said dispersed droplets to form solid catalyst particles having a predetermined size range,
(c) removing the solvent from the reaction mixture in order to obtain said solid catalyst particles.

The above general solidification principles using emulsion preparation techniques described above equally apply for any alpha-olefins, preferably for PP and PE, and also for other catalyst types than ZN, such as metallocenes.

In one preferable embodiment the PP composition is advantageously obtainable by catalyst prepared according to the emulsion/solidification technology disclosed e.g. in WO 03/000754, WO 03/000757 or WO2004029112 of Borealis, the contents of which are incorporated herein by reference.

A feasible class of catalysts to be employed in accordance with the present invention is the Ziegler-Natta catalyst described in WO 2004/029112 mentioned above. These Ziegler-Natta catalysts are subjected already during catalyst synthesis to a treatment with an alkylating agent, in particular an Al compound as illustrated in this international publication. Using such a Ziegler-Natta catalyst enables the preparation of polymer compositions in accordance with the present invention, including in particular the polymer compositions in accordance with the preferred embodiments disclosed herein, in the form of reactor-made polymer compositions not requiring any further post processing such as visbreaking. Accordingly the polymer compositions of the present invention are obtainable with the specific class of Ziegler-Natta catalysts disclosed in WO 2004/029112, incorporated herein by reference.

The PE composition may also be obtainable by any of the process described above using in one embodiment a catalyst of Ziegler Natta type which is preparable by the emulsion/solidification method adapted to PE catalyst, e.g. as disclosed in WO03106510 of Borealis, e.g. according to the principles given in the claims thereof. The contents of this document is also incorporated herein by reference.

The emulsion formation is based on the miscibility of the continuous phase and the disperse phase. The continuous phase may be substantially inert (chemically) or it may contain dissolved therein one or more of the reactants of the catalyst component. The solidification step may be effected e.g. by subjecting the emulsion system to a temperature change.

Examples of the solvents used in the continuous phase include hydrocarbons, such as aliphatic or aromatic hydrocarbons, and fluorinated hydrocarbons, such as fluorinated aliphatic or alicyclic hydrocarbons, e.g aliphatic perfluorinated hydrocarbons. For the preparation of a PP composition, examples of preferable solvents are aromatic hydrocarbons, e.g. toluene, can be used as the solvent for continuous phase. For the preparation of PE composition, preferable solvents are the above mentioned fluorinated hydrocarbons.

According to one preferable embodiment, the polymer composition is obtainable by a single stage or multistage polymerisation process as defined above using the polymerisation catalyst prepared by any process method defined above. The process may equally be a single- or multistage process of the invention as described above, depending on the properties of the produced polymer composition.

If the polymer composition is produced by a multistage process, then the polymerisation is preferably effected in the presence of a catalyst obtainable by the "catalyst preparation method" as defined above or in more detailed for PP below.

The invention also provides a polymer composition as defined above which is obtainable by any process for preparing the polymer composition as defined above, wherein a polymerisation catalyst is used which is a ZN-catalyst prepared by the "catalyst preparation method" as defined above or below.

The catalyst obtainable by the "catalyst preparation method" as defined above enables very advantageous means to produce the polymer composition of the invention, preferably the reactor-made polymer composition of the invention.

The following embodiments of a PP composition satisfying equitations (1d) or (1e) are provided only for illustrating, how the oligomer content of the polymer composition may be further optimised with the process parameters within the limits of the invention defined above or in claims:

$$\text{"oligomer content"} \leq e^{[6.7+(0.504 \cdot \ln(MFR_2))-(0.0457 \cdot T)]} \quad (1d), \text{ or}$$

$$\text{"oligomer content"} \leq e^{[7.3+(0.504 \cdot \ln(MFR_2))-(0.459 \cdot D)-(0.00317 \cdot Al/Do)-(0.0453 \cdot T)]} \quad (1e),$$

wherein in (1d) and (1e) "oligomer content" and MFR$_2$ are as defined above in equitation (1), T is the polymerization temperature, e.g. at least 70° C., preferably at least 80° C., the upper limit suitably being ≦100° C., preferably ≦90° C., Al/Do is the molar ratio between aluminium alkyl and the used external donor, and D is a number between 1 and 2, and may be e.g. 1, when the external electron donor is dicyclopentyl dimethoxy silane or has a similar effect on the oligomer content to that, and 2 when the donor is cyclohexyl methyl dimethoxy silane or has a similar effect on the oligomer content to that.

In the embodiments 1(d) and 1(e), the PP composition is preferably obtainable by a single- or multistage process as defined above using the catalyst prepared by the "catalyst preparation method" described above.

In the process of the invention or any embodiments thereof, the external donor used in the catalyst system is preferably dicyclopentyl dimethoxy silane or cyclohexyl methyl dimethoxy silane.

Embodiment (1d) shows that the increase in the temperature can decrease the oligomer content further. Embodiment (1e) shows that by using cyclohexyl methyl dimethoxy silane as the donor and/or by increasing the ratio Al/Do, the oligomer content can be further lowered or optimised, if needed, depending on the other properties desired for the end product.

In one preferable embodiment, the composition is a PP composition "catalyst preparation method" a solution of a complex of Group 2 metal and an electron donor is prepared by reacting a compound of said metal with said electron donor or a precursor thereof in an organic liquid reaction medium; reacting said complex, in solution, with a compound of a transition metal to produce an emulsion, the dispersed phase of which contains more than 50 mol % of the Group 2 metal in said complex; maintaining the particles of said dispersed phase within the average size of 5 to 200 micro meter by agitation preferably in the presence of an emulsion stabilizer and solidifying said particles. The complex of the Group 2 metal is preferably a magnesium complex.

The emulsion stabiliser is typically a surfactant, of which the preferred class is that based on acrylic polymers.

For said catalyst particles, the compound of a transition metal is preferably a compound of a Group 4 metal. The Group 4 metal is preferably titanium, and its compound to be reacted with the complex of a Gp 2 is preferably a halide.

In the "catalyst preparation method" also a turbulence minimizing agent (TMA) or mixtures thereof may be used, which are preferably polymers having linear aliphatic carbon backbone chains, which might be branched with short side chains only in order to serve for uniform flow conditions when stirring.

As electron donor compound to be reacted with the Group 2 metal compound is preferably a mono- or diester of an aromatic carboxylic acid or diacid, the latter being able to form a chelate-like structured complex. Said aromatic carboxylic acid ester or diester can be formed in situ by reaction of an aromatic carboxylic acid chloride or diacid dichloride with a $C_2$-$C_{16}$ alkanol and/or diol, and is preferable dioctyl phthalate, e.g. dioctyl (2-ethyl-hexyl)phthalate. The reaction for the preparation of the Group 2 metal complex is generally carried out at a temperature of 20° to 80° C. and in case that the Group 2 metal is magnesium, the preparation of the magnesium complex is carried out at a temperature of 50° to 70° C.

The magnesium dialkoxide may be the reaction product of a magnesium dihalide such as magnesium dichloride or a dialkyl magnesium of the formula R$_2$Mg wherein each one of the two Rs is a similar or different $C_1$-$C_{20}$ alkyl, preferably a similar or different $C_4$-$C_{10}$ alkyl, Typical magnesium alkyls are ethylbutyl magnesium, dibutyl magnesium, dipropyl magnesium, propylbutyl magnesium, dipentyl magnesium, butylpentylmagnesium, butyloctyl magnesium and dioctyl magnesium. Most preferably, one R of the formula R$_2$Mg is a butyl group and the other R is an octyl group, i.e. the dialkyl magnesium compound is butyl octyl magnesium.

Dialkyl magnesium, alkyl magnesium alkoxide or magnesium dihalide can react with a polyhydric alcohol R'(OH)$_m$ or a mixture thereof with a monohydric alcohol R'OH.

Preferable monohydric alcohols are those of formula R'OH in which R' is a $C_2$-$C_{16}$ alkyl group, most preferably a $C_4$-$C_{12}$ alkyl group, particularly 2-ethyl-1-hexanol.

Preferably, essentially all of the aromatic carboxylic acid ester is a reaction product of a carboxylic acid halide, preferably a dicarboxylic acid dihalide, more preferably an unsaturated α,β-dicarboxylic acid halide, most preferably phthalic acid dichloride, with the monohydric alcohol.

If desired an aluminium alkyl compound, optionally containing halogen may be added to the dispersion before recovering the solidified particles. This embodiment is described e.g. in the above referred WO2004029112, see e.g. claim 1. These catalysts, as well as those described in WO 2004/111098 enable the production of narrow molecular weight distribution polymer compositions of the present invention. Reference in this respect can be made to the disclosure in WO 2004/111098 and in WO 2004/029122, both incorporated herein by reference with respect to the catalyst synthesis using an alkylating agent during catalyst synthesis, which disclose suitable alkylating agents, preferably aluminium compounds comprising at least one alky substituent. It has been found that these catalysts, disclosed in the prior art in association with high temperature activity and ability to polymerise propylene and ethylene polymers having decreased xylene solubles contents and lower isotacticity, are feasible for narrowing the molecular weight distribution compared with polymeric products obtained with conventional Ziegler-Natta catalysts.

The finally obtained catalyst component is desirably in the form of particles having an average size range of 5 to 200 μm, preferably 10 to 100, more preferably 20 to 50 μm. Especially the catalyst particles obtainable by "the catalyst preparation method" are typically non-porous, i.e. their surface area is very small compared to prior art Ziegler-Natta catalysts supported on an external carrier. The surface area of the catalyst used in the present invention may be smaller than 20 m$^2$/g, preferably less than 10 m$^2$/g, and more preferably less than 5 m$^2$/g, and may even be not measurable by normal measurement apparatus. This applies also to the porosity. The active components of the catalysts are evenly distributed thorough the whole catalyst particles.

The catalytically active component obtainable by the "catalyst preparation method" as defined above may be incorporated with a cocatalyst (2) and external donor (3) as mentioned above.

E.g. the PP composition of the invention may comprise said C6-C15-oligomers in a n amount which is less than 30 wt-%, preferably less than 50 wt-% and even less than 60 wt-% compared to conventional polypropylene compositions with the same MFR$_2$, e.g. conventional polypropylene compositions described in EP395083 of Montell or EP86472 of Montedison referred before.

The present invention has been described above in relation to the beneficial features of low oligomer content, preferably in combination with the high MFR$_2$ value defined above, the narrow MWD distribution and/or the feature of the polymer composition of the present invention being a reactor-made polymer composition, optionally in the form of pellets or the like, i.e. obtained directly from the polymerisation reaction without any further post processing steps. As outlined above the present invention contemplates for polymer compositions comprising more than one polymer component to prepare same in the form of reactor blends as explained above. Suitable processes and catalysts for preparing the improved polymer compositions of the present invention are identified above.

However, the present invention provides one further surprising and particular preferred embodiment which will be described in detail in the following. All definitions provided above in connection with the present invention as well as all preferred embodiments mentioned above are also valid for this further embodiment if not further specified in the following.

Surprisingly it has been determined by the present inventors that the use of a specific class of Ziegler-Natta catalysts enables the preparation of polymer compositions as defined herein, preferably propylene homo- or copolymer, more preferably propylene homopolymers, which not only show the improvement with respect to oligomer content, i.e. low oligomer content, but which also display, compared with polymer compositions obtained with other Ziegler-Natta catalysts, a narrower MWD distribution. As illustrated in examples 1A to 10A this effect amounts to a narrowing of the molecular weight distribution of about 10% or more, an achievement which has to be considered as vast improvement in particular for fields of application where rather narrow MWD are preferred.

As is readily apparent from the above the polymer compositions of this embodiment of the present invention satisfy the low oligomer requirements of the present invention as given above, in particular the polymer compositions of this embodiment satisfy the equations as presented above in connection with the general description of the low oligomer content, namely equation (1), more preferably equation (1a), (1b) or (1c).

Accordingly the present invention provides a polymer composition as defined herein, wherein the polymer composition not only displays a lower oligomer content, as described in detail above, but also shows a narrower molecular weight distribution, compared with polymer composition which have been prepared using a Ziegler-Natta catalyst which has not been subjected to a treatment with an alkylating agent during catalyst synthesis, all other conditions being identical. As identified above the molecular weight distribution narrowing effect provided by the present invention amounts to at least 5%, preferably at least 7% and in embodiments up to about 10% or more, expressed either as SHI$_{(0/50)}$, PI or Mw/Mn (MWD), all as defined herein.

Accordingly this aspect of the present invention can be described as a narrow molecular weight distribution polymer composition, wherein the present invention enables a narrowing of the molecular weight distribution of a given polymer composition, compared with corresponding polymer composition that has a higher oligomer content than the polymer composition of the invention, e.g. compared with polymer compositions, prepared under identical conditions, but not using the catalysts for polymerisation which are described herein as suitable catalysts.

In this respect the present invention in embodiments enables a lowering of the SHI$_{(0/50)}$ value (as measure for the molecular weight distribution) by 10%, more preferably by 20%, even more preferably by 30% and most preferably by 40%, compared with corresponding polymer composition that has a higher oligomer content than the polymer composition of the invention, e.g. compared with polymer compositions being prepared under identical conditions but, as outlined above, not using any of the catalysts illustrated herein.

In a further feasible embodiment the present invention in embodiments enables a lowering of the MWD value (as measure for the molecular weight distribution) by 10%, more preferably by 20%, even more preferably by 30% and most preferably by 40%, compared with corresponding polymer composition that has a higher oligomer content than the polymer composition of the invention, e.g. compared with polymer compositions being prepared under identical conditions but, as outlined above, not using any of the catalysts illustrated herein.

These narrow molecular weight distribution polymer compositions more preferably are compositions according to equations (1n) and (1n') defined above, and in preferred embodiments also these polymer compositions are compositions in accordance with any of equations (1a) to (1c).

Also in this embodiment of the present invention it is further preferred when the polymer composition displays a combination of the parameters MFR$_2$ and narrow molecular weight distribution as outlined above in connection with the low oligomer content embodiment. These correlations are also valid for this embodiment of the present invention.

With respect to further details of this embodiment of the present invention, such as comonomer content, modality, polymerisation processes and the like reference can be made to the other parts of the specification of the present application. All information disclosed herein likewise also applies for the preferred embodiment described here.

The present invention also provides a process for producing low oligomer content and narrow molecular weight distribution polymer compositions as illustrated above. This process corresponds basically to the general process description as provided above with the exception however that the catalyst employed for polymerisation has to be a Ziegler-Natta catalyst which has been subjected during catalyst synthesis to a treatment with an alkylating agent. Reference in this connection can again be made to the two international publications mentioned above, WO 2004/111098 and in WO 2004/029122, both incorporated herein by reference with respect to the catalyst synthesis using an alkylating agent during catalyst synthesis.

As already mentioned above, all features of the description of the present application described above are also applicable to the narrow molecular weight distribution embodiment disclosed here, if not specified further herein.

DEFINITIONS AND DETERMINATION METHODS

The definitions for terms and the determination methods for the characterising properties and/or parameters are given below. These definitions and determination method descriptions apply generally both for the description part above and for the examples below, unless otherwise stated:

The oligomer content of the polymer composition means the oligomer fraction having 6 to 15 carbon atoms and can be determined using the following method:

The determination is preferably made from the reactor-made polymer product, i.e. reactor powder as obtained form the polymerisation step. The oligomer content (C6-C15) in the polymer powder was measured in the following way: 1 hour after the polymer had been taken out of the reactor about 100 gram polymer powder was put in a glass bottle and sealed. The bottle was placed in the freezer (at −18° C.), and was analysed the following day. The oligomer content was analysed with static head space gas chromatography, GC, from Hewlett Packard. 2 gram powder was placed in a 20 ml glass ampoule. After 1 hour at 120° C. a sample was automatically taken to the GC. A non polar column, silicon rubber coating, SE-30 was used. Substances containing 6, 9, 12 and 15 carbon atoms were regarded as oligomers, because oligomers more carbon atoms, 18 and more, are scarcely detected, due to low volatility. Temperature profile in the GC was: 5 minutes at 40° C., temperature increase with 10° C./min up to 250° C. and finally 4 minutes at 250° C. The GC is Hewlett Packard 5890 and the Head space is Hewlett Packard 19395.

It is to be understood that in principle any other determination method could be used which would give the corresponding results as the above determination method (within the limits of measurement accuracy as evident for a skilled person).

Mw means weight average molecular weight determined in a known manner using size exclusion chromatograpy (SEC). Unless otherwise defined, the term "molecular weight" as used herein means the weight average molecular weight Mw.

MWD means Mw/Mn, wherein Mw is the weight average molecular molecular weight and Mn is the number average molecular weight. The MWD can be determined e.g. by using a size exclusion chromatography (SEC) in a manner known in the art.

Weight-% is abbreviated as w % or wt-%.

ppm is parts per million by weight.

By the term "random copolymer" is meant herein that the comonomer in said copolymer is distributed randomly, i.e. by statistical insertion of the comonomer units, within the copolymer chain. Said term "random" copolymer is generally known and used in the art. Propylene random copolymer typically contains up to 12 wt %, preferably up to 8 wt % one or more comonomer as defined above.

The xylene solubles (XS)-fraction contains amorphous polymer chains was analyzed by the known method:

2.0 g of polymer was dissolved in 250 ml p-xylene at 135° C. under agitation. After 30±2 minutes the solution was allowed to cool for 15 minutes at ambient temperature and then allowed to settle for 30 minutes at 25±0.5° C. The solution was filtered with filter paper into two 100 ml flasks.

The solution from the first 100 ml vessel was evaporated in nitrogen flow and the residue dried under vacuum at 90° C. until constant weight is reached.

XS%=(100×$m_1$×$v_0$)/($m_0$×$v_1$), wherein $m_0$=initial polymer amount (g)

$m_1$=weight of residue (g)

$v_0$=initial volume (ml)

$V_1$=volume of analyzed sample (ml)

MFR$_2$: MFR$_2$ values are determined in a usual manner known to the skilled person in the art, wherein load and temperature are selected depending from the type of polymer, in the examples the following methods were employed: PP composition was determined according to ISO 1133 (230° C., 2.16 kg load), and for the determination of a PE composition, reference is made to ISO 1133 (190° C., 2.16 kg load).

Multimodality, including bimodality, with respect to the comonomer distribution means that the composition contains at least two polymer components having different comonomer content (wt %).

Comonomer content (wt %) can be determined in a known manner based on Fourier transform infrared spectroscopy (FTIR) determination calibrated with $C^{13}$-NMR.

Multimodality, including bimodality, with respect to the weight average molecular weight distribution means that the molecular weight profile of e.g. the polymer composition does not comprise a single peak but instead comprises two or more distinct maxima, a maximum and one or more shoulders centered about different average molecular weights, or in some cases a distinctly broadened curve. E.g. the components (i) and (ii) of the composition may comprise different molecular weights.

Melting temperature, crystallization temperature and degree of crystallinity are measured with a Mettler TA820 differential scanning colorimetry device (DSC) on 3±0.5 mg samples. Crystallization and melting temperatures are obtained during 10° C./min cooling and heating scans between 30° C. and 225° C. Melting and crystallization temperatures were taken as the peaks of endotherms and exotherms. The degree of crystallinity is calculated by comparison with the heat or fusion of a perfectly crystalline polypropylene, i.e. 209 J/g.

Flexural modulus is measured according to ISO 178 (room temperature, if not otherwise mentioned), by using injection molded test specimens as described in EN ISO 1873-2 (80×10×4 mm).

Charpy notched impact is measured according to ISO 179 (room temperature, 23° C. if not otherwise mentioned) using injection molded test specimen as described in EN ISO 1873-2 (80×10×4 mm).

Tensile strength, including tensile stress at yield and strain at yield, is measured according to ISO 572-2 (cross head speed 50 m m/min). Tensile modulus is measured according to ISO 572-2 (cross head speed 1 mm/min).

Rheology: Dynamic rheological measurements were carried out with Rheometrics RDA-II QC on compression molded samples under nitrogen atmosphere at 200° C. using 25 mm-diameter plate and plate geometry. The oscillatory shear experiments were done within the linear viscoelastic range of strain at frequencies from 0.01 to 500 rad/s. (ISO6721-1)

The values of storage modulus (G'), loss modulus (G"), complex modulus (G*) and complex viscosity (η*) were obtained as a function of frequency (ω).

The Zero shear viscosity (η$_0$) was calculated using complex fluidity defined as the reciprocal of complex viscosity. Its real and imaginary part are thus defined by $$f'(\omega)=\eta'(\omega)/[\eta'(\omega)^2+\eta''(\omega)^2] \text{ and}$$

$$f''(\omega)=\eta''(\omega)/[\eta'(\omega)^2+\eta''(\omega)^2]$$

From the following equations $$\eta'=G''/\omega \text{ and } \eta''=G'/\omega$$

$$f'(\omega)=G''(\omega)\cdot\omega/[G'(\omega)^2+G''(\omega)^2]$$

$$f''(\omega)=G'(\omega)\cdot\omega/[G'(\omega)^2+G''(\omega)^2]$$

The polydispercity index, PI, is calculated from cross-over point of G'(ω) and G"(ω).

There is a linear correlation between f' and f" with zero ordinate value of $1/\eta_0$. (Heino et al.[1])

For polypropylene this is valid at low frequencies and five first points (5 points/decade) are used in calculation of $\eta_0$.

Elasticity indexes (G') and shear thinning indexes (SHI), which are correlating with MWD and are independent of MW, were calculated according to Heino[1,2] (below).

SHI is calculated by dividing the Zero Shear Viscosity by a complex viscosity value, obtained at a certain constant shear stress value, G*. The abbreviation, SHI(0/50), is the ratio between the zero shear viscosity and the viscosity at the shear stress of 50 000 Pa.

1) Rheological characterization of polyethylene fractions. Heino, E. L.; Lehtinen, A; Tanner, J.; Seppälä, J. Neste Oy, Porvoo, Finland. Theor. Appl. Rheol., Proc. Int. Congr. Rheol., 11th (1992), 1 360-362

2) The influence of molecular structure on some rheological properties of polyethylene. Heino, Eeva-Leena. Borealis Polymers Oy, Porvoo, Finland. Annual Transactions of the Nordic Rheology Society, 1995.

DETAILED DESCRIPTION OF THE INVENTION

EXAMPLES

The starting materials are commercially available or can be produced analogously to the methods described in the literature.

Example 1

All raw materials were essentially free from water and air and all material additions to the reactor and the different steps were done under inert conditions in nitrogen atmosphere. The water content in propylene was less than 5 ppm.

The catalyst was a highly active and stereo specific Ziegler Natta catalyst (ZN catalyst) prepared according to patent WO03/000754, example 7, and had Ti content 3.37 w-%.

The polymerisation was done in a 5 liter reactor, which was heated, vacuumed and purged with nitrogen before taken into use. 553 µl TEA (triethyl aluminium, from Witco), 81 µl donor (cyclohexyl methyl dimethoxy silane, from Wacker, dried with molecular sieves) and 20 ml pentane (dried with molecular sieves and purged with nitrogen) were mixed and allowed to react for 5 minutes. Half of the mixture was added to the reactor after which the reactor was charged with 70 mmol hydrogen and 1400 g propylene. The other half of the mixture was mixed with 23.0 mg ZN catalyst in a metal cylinder and pushed into the reactor with 20 bar nitrogen. The contact time was about 20 minutes. The Al/Ti molar ratio was 250 and the Al/Do molar ratio was 10. The temperature was increased from room temperature to 70° C. during 16 minutes. The reaction was stopped, after 60 minutes at 70° C., by flashing out unreacted monomer. Finally the polymer powder was taken out from the reactor and analysed and tested. About 100 gram of the powder was put into a glass bottle and stored in the freezer for volatiles analyses the following day. The details and results are seen in table 1.

Comparative Example 1

This example was done in accordance with example 1, with the exception that a supported porous catalyst was used. The catalyst used was a typical porous 4th generation, transesterified Zieglar Natta catalyst. This type of catalyst is described in general in EP 491 566 and was prepared as follows: TiCl$_4$ was fed to reactor and cooled to −20° C. MgCl$_2$ carrier obtained by spray-crystallising MgCl$_2$(C$_2$H$_5$OH)$_n$ melt was suspended in aliphatic hydrocarbon solvent (bp, 90-110° C.) and cooled before adding to the cold TiCl$_4$. Controlled heating to 130° C. was performed. During heating di-2-ethylhexyl phthalate (DOP) eas added and transesterification (DOP to DEP, diethylphthalate) effected by keeping the mixture for 30 min at 130° C. The solid was separated by filtration and the procedure repeated 3 times, each repeat adding TiCl$_4$ to the filtered solids from the previous titanation. The catalyst was then washed 4 times with aliphatic hydrocarbon solvent and dried in vacuum to free flowing powder. The surface area and porosity of a catalyst produced was typically 250-300 m$^2$/g and 0.4-0.5 g/cm$^3$, respectively. The catalyst contained 1.9 w-% titanium.

The details and results are seen in table 1.

Comparative Example 2

This example was done in accordance with example 1, with the exception that a catalyst which can be described as a typical porous 4th generation Ziegler Natta catalyst, containing TiCl4, MgCl$_2$ as carrier and a carboxylic ester as internal donor was used. For the preparation of the catalyst the description and examples of EP 395083 of Montell are referred. The Ti content in the catalyst was 2.4 w-%. The details and results are seen in table 1.

Example 2

This example was done in accordance with example 1, with the exception that the hydrogen amount was 800 mmol. The details and results are seen in table 1.

Comparative Example 3

This example was done in accordance with example 2, with the exception that the catalyst described in comparative example 1 was used and that 650 mmol hydrogen was used. The details and results are seen in table 1.

Comparative Example 4

This example was done in accordance with example 2, with the exception that the catalyst described in comparative example 2 was used and the hydrogen amount was 450 mmol was used. The details and results are seen in table 1.

Example 3

This example was done in accordance with example 1, with the exception that as the donor dicyclopentyl dimethoxy silane with Al/Do ratio 50 was used and that the hydrogen amount was 600 mmol. The details and results are seen in table 1.

Comparative example 5

This example was done in accordance with example 3, with the exception that the catalyst described in comparative example 1 was used and that 1000 mmol hydrogen was used. The details and results are seen in table 1.

Comparative Example 6

This example was done in accordance with example 3, with the exception that the catalyst described in comparative example 2 was used and that 670 mmol hydrogen was used. The details and results are seen in table 1.

Comparative Example 7

This example was done in accordance with comparative example 5, with the exception that the hydrogen amount was 150 mmol. The details and results are seen in table 1.

Comparative Example 8

This example was done in accordance with comparative example 5, with the exception that the hydrogen amount was 10 mmol.

Comparative Example 9

This example was done in accordance with example 1, with the exception that the temperature in polymerisation was 80° C., 1000 mmol hydrogen, dicyclopentyl dimethoxy silane, Al/Do ratio of 50 and comparative example 1 was used. The details and results are seen in table 1.

Comparative Example 10

This example was done in accordance with comparative example 9, with the exception that the temperature in polymerisation was 70° C. The details and results are seen in table 1.

them having narrow molecular weight distributions, as discussed in the general part of the description above.

Example 1A

Preparation of the Soluble Mg-Complex

A magnesium complex solution was prepared by adding, with stirring, 78.0 kg of a 20% solution in toluene of butyloctylmagnesium (BOMAG A) to 27.1 kg 2-ethylhexanol in a 150 l steel reactor. During the addition the reactor contents were maintained below 35° C. After that 7.98 kg 1,2-phthaloyl dichloride was added and the reaction mixture was stirred for 60 minutes at 60° C. Solution was cooled to room temperature and stored.

Preparation of the Catalyst Component 19.5 ml titanium tetrachloride were placed in a 300 ml glass reactor equipped with a mechanical stirrer. Mixing speed was adjusted to 170 rpm. 1.0 ml of a solution in toluene of 3.0 mg polydecene and 2.0 ml Viscoplex 1-254, 32.0 g of the Mg-complex were added to the stirred reaction mixture over a 10 minute period. During the addition of the Mg-complex the reactor content was maintained below 30° C. The temperature of the reaction mixture was then slowly raised to 90° C. over a period of 30 minutes and held at that level for 30 minutes with stirring.

After settling and siphoning 100 ml of toluene containing 0.1 ml of triethylaluminium was added to the reactor. After 30

TABLE 1

Examples: Polymerisation conditions and Results

|  |  | Example 1 | Comp. example 1 | Comp. example 2 | Example 2 | Comp. example 3 | Comp. example 4 | Example 3 | Comp. example 5 | Comp. example 6 | Comp. example 7 | Comp. example 8 | Comp. example 9 | Comp. example 10 |
|---|---|---|---|---|---|---|---|---|---|---|---|---|---|---|
| Catalyst | mg | 23 | 23.8 | 18.1 | 13.1 | 17.3 | 13 | 14.3 | 13.2 | 12 | 15.5 | 28 | 9.7 | 14.9 |
| Donor | Type | 2 | 2 | 2 | 2 | 2 | 2 | 1 | 1 | 1 | 1 | 1 | 1 | 1 |
| Al/Ti | mol/mol | 250 | 250 | 250 | 250 | 250 | 250 | 250 | 250 | 250 | 250 | 250 | 500 | 500 |
| Al/Do | mol/mol | 10 | 10 | 10 | 10 | 10 | 10 | 50 | 50 | 50 | 50 | 50 | 50 | 50 |
| Hydrogen | mmol | 70 | 70 | 70 | 800 | 650 | 450 | 600 | 1000 | 670 | 150 | 10 | 1000 | 1000 |
| Temperature | ° C. | 70 | 70 | 70 | 70 | 70 | 70 | 70 | 70 | 70 | 70 | 70 | 80 | 70 |
| Yield | g | 593 | 546 | 457 | 370 | 497 | 357 | 463 | 442 | 435 | 435 | 513 | 630 | 608 |
| MFR | g/10 min | 4.2 | 3.7 | 6.3 | 113 | 87 | 82 | 82 | 92 | 85 | 4 | 0.14 | 79 | 73 |
| Xylene solubles | w-% | 1.4 | 1.6 | 3 | 2.1 | 1.9 | 3.1 | 2.1 | 2.6 | 3.6 | 2.2 | 2.2 | 1.5 | 1.5 |
| C6-C15 in polymer | ppmw | 50 | 81 | 95 | 240 | 430 | 480 | 200 | 606 | 520 | 160 | 20 | 340 | 464 |
| Mw/1000 | g/mol | 336 | 363 | 320 | 154 | 171 | 166 | 162 | 163 | 160 | 362 | — | 170 | 173 |
| Mn/1000 | G/mol | 81.4 | 75.8 | 62.4 | 21.7 | 18.4 | 18.5 | 26.1 | 10.2 | 11.7 | 39.6 | — | 23 | 18.9 |
| MWD |  | 4.1 | 4.8 | 5.1 | 7.1 | 9.3 | 9 | 6.2 | 16 | 13.7 | 9.1 | — | 7.4 | 9.1 |
| SHI (0/50) |  | 7 | 9.1 | 10.4 | 8.2 | 9.3 | 9.7 | 10.5 | 12.7 | 13.1 | 12 | 9.6 | 10.3 | 12.6 |

Donor 1 is dicylo pentyl dimethoxy silane
Donor 2 is cyclohexyl methyl dimethoxy silane The examples 1-3 clearly show the decreased oligomer levels of the polymer compositions of the invention over the comparative compounds having the similar MFR, but representing conventional prior art.

Moreover, the oligomer content of the compositions of the invention is decreased also with higher MFR values (see example 3 of the invention).

The oligomer content can further be adjusted, if desired, e.g. by the choice of the temperature and donor.

The following examples illustrate one further embodiment of the present invention, namely the surprising possibility to produce low oligomer content propylene polymers and part of minutes mixing solids were settled and liquid was siphonated. Then the solids were washed with 60 ml heptane for 20 minutes at 90° C. and with 60 ml pentane for 10 minutes at 25° C. Finally, the catalyst was dried at 60° C. by nitrogen purge.

The catalyst contained 4.3 w-% titanium.

Polymerization of propylene with the catalyst was done in a 5 liter reactor with stirrer. 0.607 ml triethyl aluminium (TEA) (=Al/Ti molar ratio 250), 0.103 ml dicyclo pentyl dimethoxy silane (donor 1) (=Al/Do molar ratio 10) and 30 ml pentane were mixed and allowed to react for 5 minutes. Half of the mixture was added to the reactor and the other half was mixed with 19.9 mg of the catalyst. After 10 minutes the catalyst/TEA/donor 1/pentane mixture was added to the reactor. 8 mmol hydrogen and 1400 gram propylene were added into the reactor and the temperature was raised to 80° C. within 20 minutes while mixing. The reaction was stopped after 30 min at 80° C. by flashing out unreacted propylene.

MFR of the polymer was 0.55 and broadness as measured with rheology (SHI(0/50)) was 7.2. The other results are shown in following table.

Example 2A

Preparation of the Liquid Mg-Complex

A magnesium complex solution was prepared by adding, with stirring, 40.5 kg of a 20% solution in toluene of butyloctylmagnesium (BOMAG A) to 14.0 kg 2-ethylhexanol in a 90 liter steel reactor. During the addition the reactor contents were maintained below 30° C. Stirring was continued 30 minutes, at which time reaction was complete. Then 4.1 kg 1,2-phthaloyl dichloride was added and stirring of the reaction mixture at 60° C. was continued for another 30 minutes and then let to cool down and stored.

Catalyst Synthesis

Into the 90 l reactor, 32 kg $TiCl_4$ was added. Then 28.8 kg of aforesaid complex was added keeping the temperature in the reactor below 35°. After that 1.24 kg Viscoplex 1-254 and 6.0 kg heptane was added. The temperature was increased to 90° C. and kept 40 min to get solid particles. After stopping the mixing and letting the catalyst settle, the liquid was removed by siphonation. The product was washed with a preheated mixture of toluene (45 kg) and a di ethyl aluminium chloride (DEAC)/toluene mixture (0.235 kg; 30 wt.-% DEAC in toluene) at about 80° C. and two times with heptane (25 kg) so that the temperature at end of second heptane was about 30° C. Product was finally mixed with white oil and stored as slurry.

Titanium content in the catalyst/oil mixture was 0.92 w-% and solid content in the mixture was 20% giving Titanium content in the dry catalyst 3.8 w-%.

Polymerisation in this example was done in accordance with example 1A, but using the catalyst described in this example. Al/Ti ratio was 150 and Al/Do ratio 5. Hydrogen amount was 15 mmol. 161 mg catalyst/oil mixture was used.

MFR of the polymer was 0.85 and broadness (SHI(0/50)) was 7.6. The other results are seen in the following table.

Comparative Example 1A

The catalyst used in this example was MCM1 from Basell. This catalyst is a typical fourth generation porous high activity catalyst. Titanium content was 2.4 w-%. The polymerisation was done in accordance with example 1, except that hydrogen amount was 10 mmol. MFR of the polymer was 0.2 and broadness (SHI(0/50)) was 11.5. The other results are seen in the following table.

Comparative Example 2A

This example was done in accordance with example 1A, with the exception that the catalyst was prepared in accordance with the Finish patent No. 88047. This catalyst can be described as a normal 4th generation, high isotacticity, high activity Ziegler-Natta catalyst for polymerisation of propylene. The catalyst is a transesterified Ziegler-Natta catalyst with Titanium content 2.1 w-% and was supported on spray crystallised $MgCl_2$. The hydrogen amount was 30 mmol. The polymer had MFR 0.41 and broadness (SHI(0/50)) 9.7. The other results are seen in the following table.

Example 3A

The catalyst prepared in example 2A was used in this example. 72 mg of the oil/catalyst mixture was used. The polymerisation was done in accordance with example 1A, except that Al/Ti molar ratio was 250 and Al/Do molar ratio was 50, temperature 70° C., time 60 minutes and hydrogen amount 750 mmol. MFR of the polymer was 45 and broadness (SHI(0/50)) 8.9. Molecular weight distribution (MWD) from size exclusion chromatography (SEC) was 7.3. The other results are seen in the following table.

Example 4A

This example was done in accordance with example 3A, except that hydrogen amount during polymerisation was 1000 mmol. MFR of the polymer was 91 and broadness (SHI(0/50)) was 9.5 MWD was 7.4 The other results are seen in the following table.

Comparative Example 3A

This example was done in accordance with example 4A, except that the catalyst used was the catalyst described in Comparative example 2A. MFR of the polymer was 92 and broadness (SHI(0/50)) was 12.7. MWD was 16. The other results are seen in the following table.

Comparative Example 4A

This example was done in accordance with example 4A, except that the catalyst used was the catalyst described in Comparative example 1A and that hydrogen amount was 670 mmol. MFR of the polymer was 85 and broadness (SHI(0/50)) was 13.1. MWD was 13.7. The other results are seen in the following table.

Example 5A

The catalyst prepared in example 1A was used in this example. 14.9 mg catalyst was used. The polymerisation was done in accordance with example 1A, except that Al/Ti molar ratio was 250, cyclo hexyl methyl dimethoxy silane was used as external donor, Al/Do molar ratio was 10, temperature 70° C., time 60 minutes and hydrogen amount 550 mmol. MFR of the polymer was 45 and broadness (SHI(0/50)) 6.6. MWD was 6. The other results are seen in the following table.

Example 6A

This example was done in accordance with example 5A, except that the amount of hydrogen was 780 mmol. MFR of the polymer was 80 and broadness (SHI(0/50)) was 6.6 MWD was 4.8. The other results are seen in the following table.

Comparative Example 5A

This example was done in accordance with example 5A, except that the catalyst described in Comparative example 2A was used and that the hydrogen amount was 650 mmol. MFR of the polymer was 87 and broadness (SHI(0/50)) 9.3. MWD was 9.3. The other results are seen in the following table.

Comparative Example 6A

This example was done in accordance with example 4A, except that the catalyst used was the catalyst described in Comparative example 1A and that hydrogen amount was 450 mmol. MFR of the polymer was 82 and broadness (SHI(0/50)) was 9.7. MWD was 9.1. The other results are seen in the following table.

Example 7A

This example was done in accordance with example 1A, except that the hydrogen amount was 150 mmol. MFR of the product was 5.9 and MWD broadness was 4.1. The other results are seen in the following table.

Example 8A

The ZN catalyst used in this example was prepared according to patent WO03/000754, example 7, and had Ti content 2.84 w-%. Polymerisation was done in accordance with example 7A, except that the hydrogen amount was 300 mmol and polymerisation time 60 min. MFR of the product was 23 and MWD broadness 4.6. The other results are seen in the following table.

Example 9A

This example was done in accordance with example 5A, except that the hydrogen amount was 70 mmol. MFR of the product was 5.6, MWD broadness 4.0 and SHI(0/50) 5.4. The other results are seen in the following table.

Comparative Example 7A

This example was done in accordance with example 9A, with the exception that the catalyst described in Comparative example 2A was used. MFR was 3.6, MWD broadness 5.7 and SHI (0/50) broadness 9.8. The other results are seen in following table.

Comparative Example 8A

This example was done in accordance with example 9A, with the exception that the catalyst described in comparative example 1A was used. MFR was 6.5, MWD broadness 4.6 and SHI (0/50) broadness 10.3. The other results are seen in the following table.

Example 10A

This example was done in accordance with example 4A, except that Al/Do molar ratio in polymerisation was 25, hydrogen amount 1000 mmol and polymerisation temperature 80° C. MFR was 62 and oligomer content 188 ppmw. The other results are seen in the following table.

| | | Ex. 1A | Ex 2A | Comp. ex. 1A | Comp. ex. 2A | Ex 3A | Ex 4A | Comp. ex. 3A | Comp. ex. 4A | Ex 5A |
|---|---|---|---|---|---|---|---|---|---|---|
| Donor | type | 1 | 1 | 1 | 1 | 1 | 1 | 1 | 1 | 2 |
| Al/Do | mol/mol | 10 | 10 | 10 | 10 | 50 | 50 | 50 | 50 | 10 |
| Temp | ° C. | 80 | 80 | 80 | 80 | 70 | 70 | 70 | 70 | 70 |
| Time | min | 30 | 30 | 30 | 30 | 60 | 60 | 60 | 60 | 60 |
| H2 | mmol | 8 | 15 | 10 | 30 | 750 | 1000 | 1000 | 670 | 550 |
| Yield | g | 196 | 336 | 496 | 472 | 641 | 410 | 442 | 435 | 551 |
| Activity | kgPP/gcat | 9.8 | 10.4 | 13 | 22.2 | 44.2 | 29.9 | 33.5 | 36.3 | 37 |
| MFR | g/10 min | 0.55 | 0.85 | 0.2 | 0.41 | 45 | 90.5 | 92 | 85 | 45 |
| XS | w-% | 1.7 | 1.4 | 0.9 | 1.1 | 1.9 | 2.4 | 2.6 | 3.6 | 2.1 |
| FTIR isotacticity | % | 95 | 96.2 | 95.3 | 97 | 100.4 | 100.3 | 102.2 | 99.9 | 96.7 |
| Tm | ° C. | 165.7 | 165.9 | 165.2 | 166.5 | 162.3 | 161.8 | 162.3 | 161.4 | 160.3 |
| Crystallinity | % | 50 | 40 | 43 | 53 | 42 | 55 | 47 | 45 | 41 |
| Tcr | ° C. | 120.4 | 119.5 | 116.9 | 116.3 | 118.8 | 118.9 | 120.3 | 118.9 | 118.3 |
| Mw/1000 | g/mol | | | | | 189 | 163 | 163 | 160 | 185 |
| Mn/1000 | g/mol | | | | | 26 | 21.9 | 10.2 | 11.7 | 30.6 |
| Mw/Mn | | | | | | 7.3 | 7.4 | 16 | 13.7 | 6 |
| SHI (0/50) | | 7.2 | 7.6 | 11.5 | 9.7 | 8.9 | 9.5 | 12.7 | 13.1 | 6.6 |
| Oilgomers | ppmw | | | | | | | | | |

| | | Ex 6A | Comp ex. 5A | Comp. ex. 6A | Ex 7A | Ex 8A | Ex 9A | Comp. ex. 7A | Comp. ex 8A | Ex 10A |
|---|---|---|---|---|---|---|---|---|---|---|
| Donor | type | 2 | 2 | 2 | 1 | 1 | 2 | 2 | 2 | 1 |
| Al/Do | mol/mol | 10 | 10 | 10 | 10 | 10 | 10 | 10 | 10 | 25 |
| Temp | ° C. | 70 | 70 | 70 | 80 | 80 | 70 | 70 | 70 | 80 |
| Time | min | 60 | 60 | 60 | 30 | 60 | 60 | 60 | 60 | 60 |
| H2 | mmol | 780 | 650 | 450 | 150 | 300 | 70 | 70 | 70 | 1000 |
| Yield | g | 605 | 497 | 357 | 271 | 524 | 589 | 410 | 677 | 624 |
| Activity | kgPP/gcat | 39.3 | 28.7 | 27.5 | 26.8 | 27.9 | 33.4 | 20.8 | 30.6 | 39 |
| MFR | g/10 min | 80.2 | 87 | 82 | 5.9 | 23 | 5.6 | 3.6 | 6.53 | 62 |
| XS | w-% | 2.4 | 1.9 | 3.1 | 1.2 | 1.2 | 1.6 | 2 | 3 | 1.4 |
| FTIR isotacticity | % | 97.8 | 100.9 | 98.8 | 98.2 | 99.4 | 93.3 | 96.2 | 94.2 | 101.7 |
| Tm | ° C. | 159.4 | 161.3 | 160.5 | 164.1 | 163.3 | 160.5 | 164.2 | 162.1 | |
| Crystallinity | % | 47 | 51 | 47 | 45 | 53 | 51 | 42 | 46 | |
| Tcr | ° C. | 117 | 118.9 | 118.6 | 117.5 | 118 | 116.3 | 118.5 | 115 | |
| Mw/1000 | g/mol | 167 | 171 | 166 | 290 | 213 | 312 | 371 | 325 | 168 |
| Mn/1000 | g/mol | 34.8 | 18.4 | 18.5 | 70.2 | 45.9 | 78 | 65.4 | 70.1 | 30.2 |
| Mw/Mn | | 4.8 | 9.3 | 9 | 4.1 | 4.6 | 4.0 | 5.7 | 4.6 | 5.6 |
| SHI (0/50) | | 6.6 | 9.3 | 9.7 | | | 5.4 | 9.8 | 10.3 | 6.3 |
| Oilgomers | ppmw | | | | | | | | | 188 |

Examples 1B and 2B and Comparative Example 1B

Polymers of the Invention Prepared in a Two Stage Polymerisation Process

Some of the catalysts exemplified above were furthermore used for polymerisation reaction in a pilot plant comprising a loop reactor and a gas phase reactor. The relevant process conditions and results are summarized in the following description and tables.

The examples 1B and 2B of the invention and the Comparative Example were prepared in a continuous multistage process in pilot scale comprising a loop reactor and a fluidised bed gas phase reactor as follows:

The catalyst used was a highly active, MgCl2-supported Ziegler-Natta catalyst prepared according to example 1A (for further description of the emulsion/solidification preparation method of the catalyst, reference is made to WO2004029112). The catalyst is also characterized in Table 2. Triethyl aluminium was used as a cocatalyst with Al/Ti molar ratio of 200. The catalyst was prepolymerised in a known manner in the presence of propylene and the co-catalyst in a separate prepolymerisation step. Then propylene, and hydrogen were fed together with the prepolymerised catalyst into the loop reactor which operated as a bulk reactor at conditions given in Table 2 (production of loop fraction). Then the polymer slurry stream was fed from the loop reactor into the gas phase reactor and more propylene and hydrogen were fed in the gas phase reactor (production of the gas phase reactor fraction in the presence of the loop-fraction to obtain the matrix component). The polymerisation conditions therein are given in the tables below. These examples are representative for TF applications. The catalyst used in the comparative example was a stereospecific trans-esterified MgCl2-supported Ziegler-Natta catalyst prepared according to U.S. Pat. No. 5,234,879.

Table for Examples 1B, 2B and Comparative Example 1B

| Catalyst type | Example 1B | Example 2B | Comparative Example 1B |
|---|---|---|---|
| Donor type | 1 | 1 | 1 |
| Al/donor ratio (mol/mol)) | 49 | 49 | |
| Loop | | | |
| Temperature ° C. | 80 | 80 | |
| MFR (g/10 min) | 13 | 12 | |
| XS % | 3 | 3 | |
| GPR | | | |
| Temperature ° C. | 80 | 80 | |
| MFR2 (g/10 min) | 10.0 | 11.0 | |
| XS (%) | 1.9 | 2.0 | |
| Pellet MFR | 11 | 11 | 12 |
| Ethene (wt-%) | 0.0 | 0.2 | 0.3 |
| Zero viscosity Pa * s | 2695 | 2638 | 2825 |
| SHI (0/50) | 5.3 | 5.1 | 6.6 |
| PI | 3.3 | 3.3 | 3.7 |
| G' (2KPA) | 439 | 429 | 517 |
| Tm (° C.) | 163.7 | 160.6 | 158.0 |
| Cryst (%) | 55.0 | 52.0 | 50.5 |
| Tcr (° C.) | 124.8 | 121.5 | 116.6 |
| Tensile Modulus (MPa) | 1710 | 1590 | 1370 |
| Tens, Stress at yield (Mpa) | 36.7 | 35.3 | 27.4 |
| Tensile strain at yield (%) | 8.1 | 8.7 | 6.1 |
| Charpy Impact, notched (kJ/m²), 23° C. | 3.7 | 3.6 | 4.3 |

Examples 3B to 5B

Polymers Prepared in One Stage Pilot Loop Reactor

Examples 3B and 4B of the invention: The catalyst was the same as in examples 1B and 2B above. In Example 5B of the invention the catalyst as described in example 1 was used. Examples 3B-5B were prepared in a loop reactor according to that as described for Examples 1B and 2B, except that the polymerisation temperature was 70° C.

Table of Examples 3B to 5B

| Catalyst type | Example 3B | Example 4B | Example 5B |
|---|---|---|---|
| Donor type | 2 | 2 | 2 |
| Al/donor ratio (wt/wt) | 30 | 20 | 20 |
| Ethylene wt-% | | | |
| MFR2 (g/10 min) | 27 | 27 | 26 |
| XS (%) | 3.9 | 2.7 | 3.1 |
| Pellet | | | |
| Zero viscosity (Pas) | 1208 | 1200 | 1141 |
| SHI (0/50) | 7.6 | 7.1 | 7.9 |
| PI | 3.8 | 3.6 | 3.6 |
| G' (2KPA) | 540 | 511 | 576 |
| Tm (° C.) | 161.7 | 162.4 | 163.0 |
| Cryst (%) | 50.0 | 50.0 | 50.0 |
| Tcr (° C.) | 117.0 | 116.9 | 117.6 |
| Tensile Modulus (MPa) | 1460 | 1480 | 1510 |
| Tens. Stress at yield (Mpa) | 33 | 34 | 34 |
| Tensile strain at yield (%) | 9.3 | 9.0 | 8.8 |
| Charpy Impact, notched (kJ/m²), 23° C. | 3.0 | 2.9 | 2.9 |

These examples demonstrate that the present invention achieves the desired polymer properties, such as low oligomer content and/or narrow molecular weight distribution without requiring post polymerisation steps, such as regularly required in the prior art.

The invention claimed is:

1. An alpha-olefin homo- or copolymer composition comprising at least one (i) alpha-olefin homo- or copolymer component, wherein
   (a) the alpha-olefin homo- or copolymer composition is a reactor-made polymer composition not subjected to a post reactor treatment that further modifies the MFR of the polymer product or a treatment that modifies the oligomer content or MFR of the composition, the composition comprising $C_6$-$C_{15}$-oligomers in an amount which satisfies the following equation (1):

$$\text{"oligomer content"} \leq e^{[3.5+(0.504 \cdot \ln(MFR_2))]} \quad (1)$$

wherein

"oligomer content" is the amount, in ppm, of alpha-olefin $C_6$-$C_{15}$-oligomer and "$MFR_2$" is the $MFR_2$ value of the alpha-olefin homo- or copolymer composition as determined from the composition, and (b) $MFR_2$ of said composition is at least 0.001 g/10 min, the composition is produced in a single stage polymerization process in the presence of solid catalyst particles comprising a compound of a transition metal of Group 3 to 10 of the Periodic Table, or of an actinide or a lanthanide, the solid catalyst particles having an average size range of 5 to 200 μm and a surface area of less than 20 m²/g, the solid catalyst particles being prepared by an emulsion and solidification method comprising (a) forming a liquid/liquid emulsion system, which contains a homogeneous solution of at least one catalyst component, said solution being dispersed as droplets in a solvent immiscible therewith and forming the dispersed phase of the liquid/liquid emulsion system, b) solidifying said dispersed droplets to form solid catalyst particles having a predetermined size range, and c) removing the solvent from the reaction mixture in order to obtain said solid catalyst particles, and recovering the particles.

2. The composition according to claim 1 which is a propylene homo- or copolymer composition comprising at least one (i) propylene homo- or copolymer component, wherein (a) said composition comprises propylene C6-C15-oligomers in an amount which satisfies the following equation (1'):

$$\text{"oligomer content"} \leq e^{[3.5 + (0.504 \cdot \ln(MFR_2))]} \tag{1'}$$

wherein

"oligomer content" means the amount of propylene C6-C15-oligomers, in ppm, and $MFR_2$ means the $MFR_2$ value of the propylene homo- or copolymer composition as determined according to ISO 1133 (at 230° C., using 2.16 kg load), and (b) $MFR_2$ of said composition is at least 0.001 g/10 min.

3. The composition of claim 1, wherein (a) the composition has an oligomer content that satisfies the following equation (1a):

$$\text{"oligomer content"} \leq e^{[(3.3 + (0.504 \cdot \ln(MFR_2))]} \tag{1a}.$$

4. The composition according to claim 1, wherein (a) the composition has an oligomer content that satisfies the Following equation (1b):

$$\text{"oligomer content"} \leq e^{[(2.8 + (0.504 \cdot \ln(MFR_2))]} \tag{1b}.$$

5. The composition according to claim 1, wherein the $MFR_2$ is selected from:

(a) $MFR_2$ is 1000 g/10 min or less,
(b) $MFR_2$ is 500 g/10 min or less,
(c) $MFR_2$ is 100 g/10 min or less,
(d) $MFR_2$ is 50 g/10 min or less,
(e) $MFR_2$ is 10 g/10 min or less,
(f) $MFR_2$ is 1 g/10 min or less.

6. The composition according to claim 1, wherein (b) the $MFR_2$ is at least 0.01 g/10 min.

7. The composition in accordance with claim 1, wherein the $MFR_2$ is at least 15 g/10 min.

8. The composition in accordance with claim 1 in the form of pellets.

9. The composition in accordance with claim 1, wherein the molecular weight distribution, expressed as $SHI_{(0/50)}$ is below 15.

10. The composition of claim 1 which is a homo- or copolymer composition of propylene or ethylene.

11. The composition of claim 1, which is a propylene homopolymer composition.

12. The composition of claim 1 comprising at least two different components:

(i) a homo- or copolymer first component of an alpha-olefin and
(ii) a homo- or copolymer second, different component of an alpha-olefin.

13. A propylene homo- or copolymer composition comprising at least one (i) alpha-olefin homo- or copolymer component, wherein (a) the alpha-olefin homo- or copolymer composition is a reactor-made polymer composition not subjected to a post reactor treatment that further modifies the MFR of the polymer product or a treatment that modifies the oligomer content or MFR of the composition, the composition comprising $C_6$-$C_{15}$-oligomers in an amount which satisfies the following equation (1n):

$$\text{Oligomer content} \leq e^{(3.83 + 0.398 \cdot \ln(MFR_2) + 0.0669 \cdot MWD)} \tag{1n}$$

wherein

"oligomer content" is the amount, in ppm, of alpha-olefin $C_6$-$C_{15}$-oligomer, $MFR_2$ means the $MFR_2$ value of the alpha-olefin homo- or copolymer composition as determined according to ISO 1133 (at 230° C., using 2.16 kg load), MWD is a molecular weight distribution Mw/Mn, and wherein (b) $MFR_2$ of said composition is at least 0.5 g/10 min, and (c) MWD of said composition is at least 3, the composition is produced in a single stage polymerization process in the presence of solid catalyst particles comprising a compound of a transition metal of Group 3 to 10 of the Periodic Table, or of an actinide or a lanthanide, the solid catalyst particles having an average size range of 5 to 200 μm and a surface area of less than 20 m²/g, the solid catalyst particles being prepared by an emulsion and solidification method comprising (a) forming a liquid/liquid emulsion system, which contains a homogeneous solution of at least one catalyst component, said solution being dispersed as droplets in a solvent immiscible therewith and forming the dispersed phase of the liquid/liquid emulsion system, b) solidifying said dispersed droplets to form solid catalyst particles having a predetermined size range, and c) removing the solvent from the reaction mixture in order to obtain said solid catalyst particles, and recovering the particles.

14. A reactor made alpha-olefin homo- or copolymer composition that is not subjected to a post reactor treatment that further modifies the MFR of the polymer product or a treatment that modifies the oligomer content or MFR of the composition, the composition being selected from at least one of the compositions (P1) to (P7):

(P1) a composition having a $MFR_2$ of not more than 1000 g/10 min and an oligomer content of less than 1100 ppm,
(P2) a composition having a $MFR_2$ of not more than 500 g/10 min and an oligomer content of less than 760 ppm,
(P3) a composition having a $MFR_2$ of not more than 100 g/10 min and an oligomer content of less than 340 ppm,
(P4) a composition having a $MFR_2$ of not more than 50 g/10 min and an oligomer content of less than 240 ppm,
(P5) a composition having a $MFR_2$ of not more than 10 g/10 min and an oligomer content of less than 110 ppm,
(P6) a composition having a $MFR_2$ of not more than 1 g/10 min and an oligomer content of less than 35 ppm, and
(P7) a composition having a $MFR_2$ of not more than 0.1 g/10 min and an oligomer content of less than 10 ppm, the composition is produced in a single stage polymerization process in the presence of solid catalyst particles comprising a compound of a transition metal of Group 3 to 10 of the Periodic Table, or of an actinide or a lanthanide, the solid catalyst particles having an average size range of 5 to 200 μm and a surface area of less than 20 m²/g, the solid catalyst particles being prepared by an emulsion and solidification method comprising (a) forming a liquid/liquid emulsion system, which contains a homogeneous solution of at least one catalyst component, said solution being dispersed as droplets in a solvent immiscible therewith and forming the dispersed phase of the liquid/liquid emulsion system, b) solidifying said dispersed droplets to form solid catalyst particles having a predetermined size range, and c) removing the solvent from the reaction mixture in order to obtain said solid catalyst particles, and recovering the particles.

\* \* \* \* \*